(12) United States Patent
Havin et al.

(10) Patent No.: US 9,495,278 B2
(45) Date of Patent: Nov. 15, 2016

(54) DYNAMIC DISCOVERY OF DATA SEGMENTS WITHIN INSTRUMENTED CODE

(75) Inventors: Victor Havin, Mountain View, CA (US); Sergey Cherkasov, San Jose, CA (US); Jonathan M. Sanders, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 1806 days.

(21) Appl. No.: 11/616,567

(22) Filed: Dec. 27, 2006

(65) Prior Publication Data

US 2008/0163180 A1 Jul. 3, 2008

(51) Int. Cl.
*G06F 9/44* (2006.01)
*G06F 11/36* (2006.01)

(52) U.S. Cl.
CPC .................................. *G06F 11/3612* (2013.01)

(58) Field of Classification Search
None
See application file for complete search history.

(56) References Cited

U.S. PATENT DOCUMENTS

| | | | | |
|---|---|---|---|---|
| 5,193,180 A | * | 3/1993 | Hastings | 717/163 |
| 5,313,616 A | * | 5/1994 | Cline et al. | 717/127 |
| 5,628,017 A | * | 5/1997 | Kimmerly et al. | 717/127 |
| 5,909,577 A | * | 6/1999 | Devanbu | 717/127 |
| 6,161,219 A | * | 12/2000 | Ramkumar et al. | 717/130 |
| 6,230,313 B1 | * | 5/2001 | Callahan et al. | 717/128 |
| 6,314,558 B1 | * | 11/2001 | Angel | G06F 11/3612 714/35 |
| 6,430,741 B1 | * | 8/2002 | Mattson et al. | 717/154 |
| 6,851,074 B2 | * | 2/2005 | Miloiicic et al. | 714/20 |
| 6,957,422 B2 | * | 10/2005 | Hunt | 717/130 |
| 6,966,057 B2 | * | 11/2005 | Lueh | 717/158 |
| 6,973,417 B1 | * | 12/2005 | Maxwell et al. | 703/2 |
| 7,103,878 B2 | * | 9/2006 | Fahs et al. | 717/130 |
| 7,210,118 B2 | * | 4/2007 | Hastings | 717/100 |
| 7,269,824 B2 | * | 9/2007 | Noy et al. | 717/127 |
| 7,269,828 B2 | * | 9/2007 | Civlin | 717/158 |
| 7,493,630 B2 | * | 2/2009 | Hunt | 719/330 |
| 7,661,094 B2 | * | 2/2010 | Blevin | G06F 11/3476 717/128 |
| 7,698,692 B1 | * | 4/2010 | Garud et al. | 717/130 |
| 7,849,450 B1 | * | 12/2010 | Rydh | G06F 11/366 717/129 |
| 8,276,127 B2 | * | 9/2012 | Rydh | G06F 11/366 717/129 |

(Continued)

*Primary Examiner* — Tuan Q. Dam
*Assistant Examiner* — Zheng Wei
(74) *Attorney, Agent, or Firm* — Steven M. Greenberg, Esq.; CRGO Law

(57) ABSTRACT

Embodiments of the present invention address deficiencies of the art in respect to code instrumentation and provide a method, system and computer program product for dynamic discovery of data segments within instrumented code. In an embodiment of the invention, a method for dynamic data segment discovery for instrumented code can be provided. The method can include statically instrumenting program code, recording potential data segments during the instrumentation of the program code, executing the instrumented program code, determining whether or not each of the recorded potential data segments can be resolved, and noting resolved ones of the recorded potential data segments.

11 Claims, 1 Drawing Sheet

(56) References Cited

U.S. PATENT DOCUMENTS

| | | | |
|---|---|---|---|
| 2001/0047510 A1* | 11/2001 | Angel | G06F 11/3612 717/128 |
| 2002/0144241 A1* | 10/2002 | Lueh | 717/136 |
| 2002/0144245 A1* | 10/2002 | Lueh | 717/140 |
| 2003/0060951 A1* | 3/2003 | Mayer et al. | 701/29 |
| 2003/0233636 A1* | 12/2003 | Crawford | G06F 11/28 717/130 |
| 2004/0117771 A1* | 6/2004 | Venkatapathy | G06F 11/3624 717/130 |
| 2004/0133882 A1* | 7/2004 | Angel | G06F 11/3612 717/130 |
| 2005/0066310 A1* | 3/2005 | Creamer | G06F 11/362 717/127 |
| 2005/0071821 A1* | 3/2005 | Levine et al. | 717/130 |
| 2005/0125777 A1* | 6/2005 | Calder | G06F 11/3457 717/131 |
| 2005/0223048 A1* | 10/2005 | Smith et al. | 707/205 |
| 2005/0223363 A1* | 10/2005 | Black-Ziegelbein | G06F 11/3624 717/127 |
| 2005/0223368 A1* | 10/2005 | Smith et al. | 717/128 |
| 2006/0101419 A1* | 5/2006 | Babcock | G06F 11/3676 717/130 |
| 2006/0259830 A1* | 11/2006 | Blevin | G06F 11/3644 714/45 |
| 2006/0277371 A1* | 12/2006 | Cohn et al. | 711/147 |
| 2007/0150872 A1* | 6/2007 | Vohra | 717/130 |
| 2008/0127120 A1* | 5/2008 | Kosche et al. | 717/131 |
| 2011/0061043 A1* | 3/2011 | Rydh | G06F 11/366 717/131 |

\* cited by examiner

DYNAMIC DISCOVERY OF DATA SEGMENTS WITHIN INSTRUMENTED CODE

BACKGROUND OF THE INVENTION

Field of the Invention

The present invention relates to the field software testing and more particularly to code instrumentation for software testing and analysis.

Description of the Related Art

The art of software development extends far beyond a mere coding of a functional specification for a computer program. Modern software development conforms to a lifecycle which begins with the functional specification leading into the formulation of a suitable architecture for an application implementing the functional specification. The lifecycle continues with the physical coding of the application and includes iterative testing and modification cycles to ensure the integrity of the code. Finally, the execution of the completed code can be analyzed to facilitate the further revision of the code to improve the performance of the code.

Traditional testing of a computer program can include the external monitoring of the integrity of the program and the performance of the program, either subjectively based upon end user impression, or objectively based upon independently acquired metrics. In the latter circumstance, the integrity of the program can include the simulation of user interaction with the user interface of the program to ensure the proper operation of the program logic. Likewise, the performance of the program can include an internal monitoring of the code through software test tooling as is known in the art.

Code instrumentation is a common form of software test tooling. In code instrumentation, compiled code objects can be decomposed and annotated with additional program code to facilitate in the analysis of code execution and performance. In order to effectively instrument code, the compiled object first must be pre-processed to document all possible code paths and to separate the program code from the data acted upon by the program code. Methods used to pre-process the compiled object include using debugging information and import/export tables, implementing branch following, scanning relocation tables and performing a liveness analysis as will be understood by the skilled artisan.

While conventional compiled object pre-processing methods have proven adequate for some, circumstances arise where conventional compiled object processing falls short of being effective. In this regard, exported data within a binary model often can be mistaken for program code—particularly where the exported data is embedded in the source code as an exported variable. When exported data is embedded in source code, the exported data will be instrumented as program code. Consequently, data corruption can arise as can run-time crashing.

BRIEF SUMMARY OF THE INVENTION

Embodiments of the present invention address deficiencies of the art in respect to code instrumentation and provide a novel and non-obvious method, system and computer program product for dynamic discovery of data segments within instrumented code. In an embodiment of the invention, a method for dynamic data segment discovery for instrumented code can be provided. The method can include statically instrumenting program code, recording potential data segments during the instrumentation of the program code, executing the instrumented program code, determining whether or not each of the recorded potential data segments can be resolved, and noting resolved ones of the recorded potential data segments.

In one aspect of the embodiment, the method further can include serializing the resolved ones of the recorded potential data segments into the instrumented program code. In another aspect of the embodiment, the method can include storing the resolved ones of the recorded potential data segments in a separate file. In either aspect of the embodiment, the method can include successively repeating the executing, determining and noting steps to reduce a number of unresolved potential data segments.

Notably, recording potential data segments during the instrumentation of the program code can include storing the potential data segments during the instrumentation of the program code as entries in a dynamic access and reference table. Also, determining whether or not each of the recorded potential data segments can be resolved, can include identifying a dynamic address for each recorded potential data segment, comparing the dynamic address to a pre-recorded offset and a combined pre-recorded offset and size for each potential data segment, and marking each potential data segment as resolved if the dynamic address is greater than or equal to the offset and less than or equal to the combined offset and size.

In another embodiment of the invention, a code instrumentation data processing system can be configured for dynamic data segment discovery. The system can include a run-time coupled to a development environment, a code repository of instrumented code, a dynamic access and reference table of potential data segments, and dynamic data segment discovery logic. The logic can include program code enabled to execute the instrumented program code, to determine whether or not each of the potential data segments can be resolved, and to note resolved ones of the recorded potential data segments in the dynamic access and reference table.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for dynamic data discovery of data segments within instrumented code. In accordance with an embodiment of the present invention, binary program code can be statically instrumented with all potential data segments being recorded in a separate program section. At runtime, each of the potential data segments can be retrieved from the separate program section and resolved to data references indicating the presence of an actual data segment. Potential data segments unable to resolve can be presumed to be actual program code. Thereafter, the resolved references can stored separately from the unresolved references such that subsequent runs of the instrumented code can access the resolved references while excluding the unresolved references.

Figure 1:
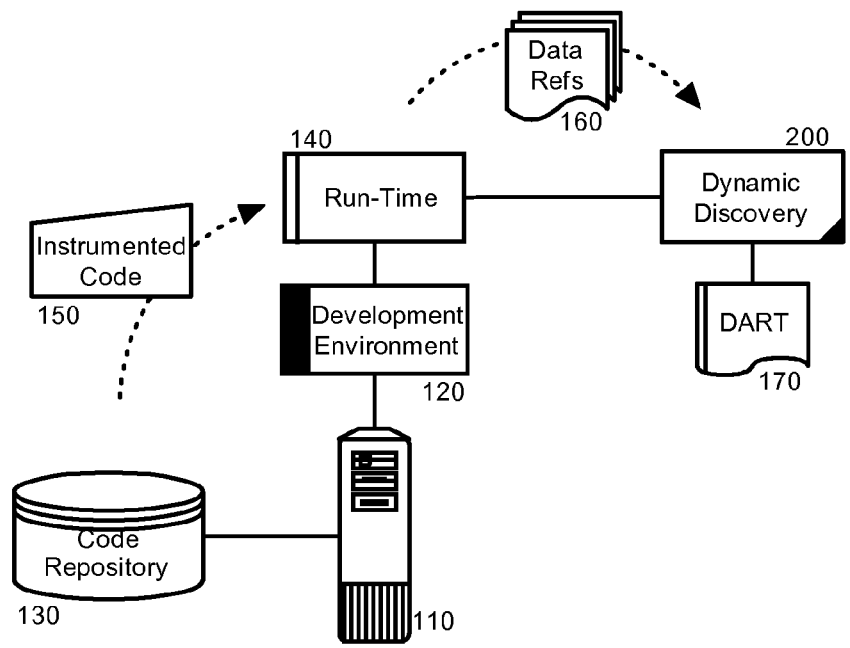
FIG. 1 is a schematic illustration of a code instrumentation data processing system configured for dynamic discovery of data segments within instrumented code; and, FIG. 2 is a flow chart illustrating a process for dynamic data discovery of data segments within instrumented code.

In illustration, FIG. 1 is a schematic illustration of a code instrumentation data processing system configured for dynamic discovery of data segments within instrumented code. The system can include a host computing platform 110 supporting the operation of a development environment 120. The development environment 120 can be configured to manage software development and compilation of program objects in a code repository 130. The development environment 120 further can be configured to facilitate static code instrumentation of compiled objects in the code repository. Finally the development environment 120 can be coupled to a run-time environment 140 enabled to execute instrumented code 150 in the code repository 130 in order to debug and performance analyze underlying compiled objects.

Importantly, dynamic discovery logic 200 can be coupled to the run-time 140. The dynamic discovery logic 200 can include program code enabled to confirm data accessed during run-time data access references 160 in a dynamic access and reference table 170. The dynamic access and reference table 170 can include potential data segments in the instrumented code 150. Initially populated during static instrumentation, during run-time, the dynamic access and reference table 170 can include a shrinking population of references to potential data segments as the program code of the dynamic discovery logic 200 confirms individual ones of the potential data segments.

Figure 2:
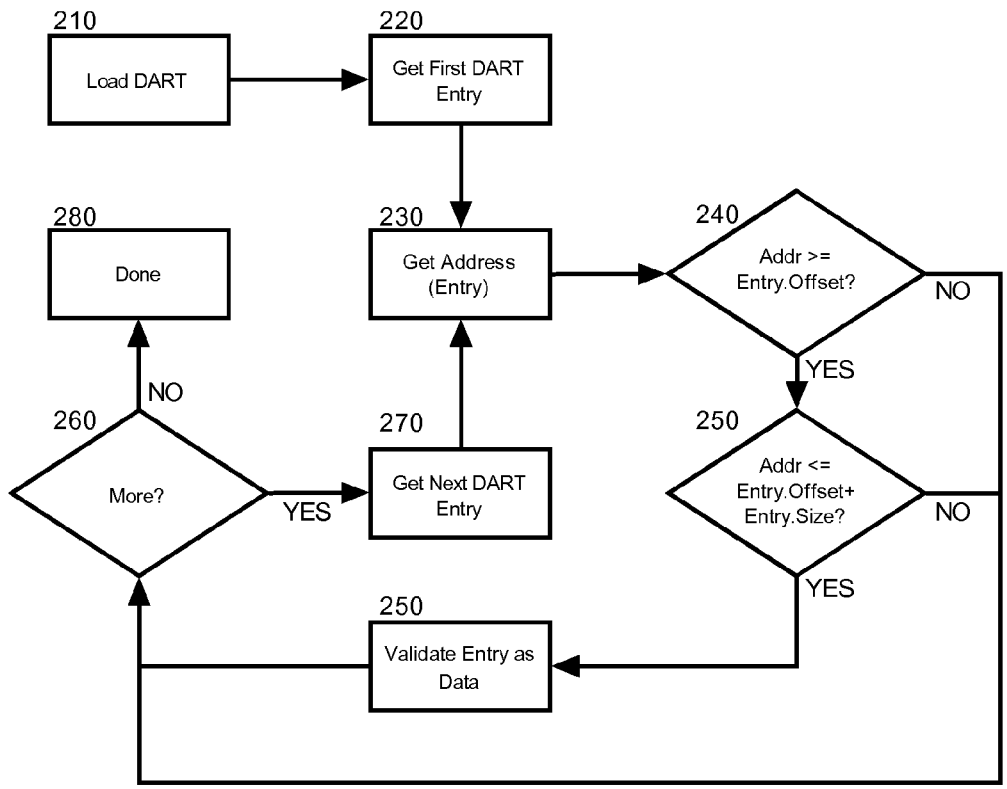

In further illustration of the operation of the dynamic discovery logic 200, FIG. 2 is a flow chart illustrating a process for dynamic data discovery of data segments within instrumented code. Beginning in block 210, a previously populated dynamic discovery and reference table 170 can be loaded for analysis. In block 220, during run-time of instrumented code, a first entry in the dynamic discovery and reference table can be selected the address of the entry in the instrumented code can be retrieved in block 230.

In decision block 240, it can be determined if the dynamic address of the entry is greater than or equal to the offset for the original address of the entry before instrumentation. If so, in decision block 250 it can be determined if the dynamic address of the entry is less than or equal to the offset of the entry combined with the size of the entry. If so, the data referenced by the entry in the dynamic discovery and reference table can be presumed valid and resolved. Otherwise, the data reference can be presumed unresolved and not actually referring to a data segment.

If in decision block 250, the entry is determined to be valid and resolved, in block 250, the entry can be noted valid in the dynamic discovery and reference table. Thereafter, in decision block 260, if additional references remain to be considered, in block 270 a next entry in the dynamic discovery and reference table can be selected for processing and the process can repeat through block 230. Otherwise, the process can end in block 280.

Notably, for each run-time pass of the instrumented code, the resolved references in the dynamic discovery and reference table can be serialized back into the instrumented code or into a separate file of known, resolved data segments. In this way, the content of the dynamic discovery and reference table can shrink over time leaving only unresolved references that can be excluded during run-time. As new data segments are discovered during run-time of the instrumented code, the newly discovered data segments can be compared to the dynamic discovery and reference table to resolve additional references. Once the source code for the instrumented code becomes recompiled, however, the dynamic discovery and reference table can be invalidated and the dynamic data discovery process restarted.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for dynamic data segment discovery for instrumented code, the method comprising:

populating a table with recorded potential data segments in program code while statically instrumenting the program code;

executing the instrumented program code;

determining during the execution of the instrumented program code whether or not each of the potential data segments in the table can be resolved by identifying a dynamic address for each recorded potential data segment, comparing the dynamic address to a pre-recorded offset and a combined pre-recorded offset and size for each potential data segment and marking each potential data segment as resolved if the dynamic address is greater than or equal to the offset and less than or equal to the combined offset and size; and, confirming in the table resolved ones of the recorded potential data segments, the confirming during execution of the program code shrinking the table leaving only unresolved references to be excluded during run-time of the program code so as to reduce a number of the potential data segments in the table.

2. The method of claim 1, further comprising serializing the resolved ones of the recorded potential data segments into the instrumented program code.

3. The method of claim 1, further comprising storing the resolved ones of the recorded potential data segments in a separate file.

4. The method of claim 1, further comprising successively repeating the executing, determining and noting steps to reduce a number of unresolved potential data segments.

5. The method of claim 1, wherein recording potential data segments during the instrumentation of the program code, comprises storing the potential data segments during the instrumentation of the program code as entries in a dynamic access and reference table.

6. A code instrumentation data processing system configured for dynamic data segment discovery, the system comprising:
  a host computing system comprising at least one computer with memory and at least one processor;
  a run-time coupled to a development environment executing in the memory of the host computing system;
  a code repository of instrumented code included as part of the host computing system;
  a dynamic access and reference table of potential data segments disposed in the memory of the host computing system; and,
  dynamic data segment discovery logic comprising program code enabled upon execution in the memory of the host computing system to populate the table with recorded potential data segments in program code while statically instrumenting the program code execute the instrumented program code, to determine during the execution of the instrumented program code whether or not each of the potential data segments in the table can be resolved by identifying a dynamic address for each recorded potential data segment, comparing the dynamic address to a pre-recorded offset and a combined pre-recorded offset and size for each potential data segment and marking each potential data segment as resolved if the dynamic address is greater than or equal to the offset and less than or equal to the combined offset and size, and to confirm in the table resolved ones of the recorded potential data segments, the confirming during execution of the program code shrinking the table leaving only unresolved references to be excluded during run-time of the program code so as to reduce a number of the potential data segments in the table.

7. A computer program product comprising a non-transitory computer usable storage memory device that stores computer usable program code therein for dynamic data segment discovery for instrumented code, the computer program product comprising:
  computer usable program code for populating a table with recorded potential data segments in program code while statically instrumenting the program code;
  computer usable program code for executing the instrumented program code;
  computer usable program code for determining during the execution of the instrumented program code whether or not each of the potential data segments in the table can be resolved by identifying a dynamic address for each recorded potential data segment, comparing the dynamic address to a pre-recorded offset and a combined pre-recorded offset and size for each potential data segment and marking each potential data segment as resolved if the dynamic address is greater than or equal to the offset and less than or equal to the combined offset and size; and,
  computer usable program code for confirming in the table noting resolved ones of the recorded potential data segments, the confirming during execution of the program code shrinking the table leaving only unresolved references to be excluded during run-time of the program code so as to reduce a number of the potential data segments in the table.

8. The computer program product of claim 7, further comprising computer usable program code for serializing the resolved ones of the recorded potential data segments into the instrumented program code.

9. The computer program product of claim 7, further comprising computer usable program code for storing the resolved ones of the recorded potential data segments in a separate file.

10. The computer program product of claim 7, further comprising computer usable program code for successively repeating the executing, determining and noting steps to reduce a number of unresolved potential data segments.

11. The computer program product of claim 7, wherein the computer usable program code for recording potential data segments during the instrumentation of the program code, comprises computer usable program code for storing the potential data segments during the instrumentation of the program code as entries in a dynamic access and reference table.

* * * * *